(12) United States Patent
Sone et al.

(10) Patent No.: US 7,285,323 B2
(45) Date of Patent: Oct. 23, 2007

(54) OPTICAL MULTILAYER FILM, POLARIZING PLATE AND OPTICAL PRODUCT

(75) Inventors: Atsushi Sone, Tokyo (JP); Tetsuya Toyoshima, Tokyo (JP); Kohei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/562,567

(22) PCT Filed: Jun. 28, 2004

(86) PCT No.: PCT/JP2004/009119

§ 371 (c)(1),
(2), (4) Date: Dec. 27, 2005

(87) PCT Pub. No.: WO2005/001525

PCT Pub. Date: Jan. 6, 2005

(65) Prior Publication Data

US 2006/0164740 A1    Jul. 27, 2006

(30) Foreign Application Priority Data

Jun. 26, 2003  (JP)  ............................. 2003-181987
Jul. 9, 2003   (JP)  ............................. 2003-272229

(51) Int. Cl.
  *B32B 5/18*    (2006.01)
  *B32B 7/02*    (2006.01)
  *B32B 23/08*   (2006.01)
  *B32B 27/32*   (2006.01)
  *B32B 27/36*   (2006.01)

(52) U.S. Cl. ............... 428/212; 428/304.4; 428/312.2; 428/312.6; 428/446; 428/447; 428/448; 428/451; 428/452; 428/480; 428/500; 428/523; 359/580; 359/586; 349/122; 349/137

(58) Field of Classification Search ............... None
See application file for complete search history.

(56) References Cited

U.S. PATENT DOCUMENTS 5,318,830 A    6/1994  Takamatsu et al.
5,747,152 A *  5/1998  Oka et al. ................. 428/323

(Continued)

FOREIGN PATENT DOCUMENTS

JP    9-227713 A    9/1997

(Continued)

OTHER PUBLICATIONS

S.P. Mukherjee, Journal of Non-Crystalline Solids, vol. 48, pp. 177-184, 1982.

(Continued)

*Primary Examiner*—Vivian Chen
(74) *Attorney, Agent, or Firm*—Birch, Stewart, Kolasch & Birch, LLP

(57) ABSTRACT

An optical multilayer film comprising a hard coat layer and a low refractive index layer comprising aerogel, which layers are laminated, in this order, directly or with another intervening layer on one surface of a base film comprising a transparent resin, wherein the refractive index $n_H$ of the hard coat layer and the refractive index $n_L$ of the low refractive index layer satisfy the following three formulae [1], [2] and [3], $1.25 \leq n_L \leq 1.37$     Formula [1]

$n_H \geq 1.53$     Formula [2]

$(n_H)^{1/2} - 0.2 < n_L < (n_H)^{1/2} + 0.2$.     Formula [3.]

10 Claims, 2 Drawing Sheets

U.S. PATENT DOCUMENTS

| | | | |
|---|---|---|---|
| 5,919,555 A * | 7/1999 | Yasuda et al. | 428/206 |
| 5,945,209 A * | 8/1999 | Okazaki et al. | 428/304.4 |
| 6,166,855 A * | 12/2000 | Ikeyama et al. | 359/580 |
| 6,207,263 B1 * | 3/2001 | Takematsu et al. | 428/220 |
| 6,210,858 B1 * | 4/2001 | Yasuda et al. | 430/270.1 |
| 6,335,832 B1 * | 1/2002 | Oka et al. | 359/582 |
| 6,572,973 B1 * | 6/2003 | Taruishi et al. | 428/447 |
| 6,686,031 B2 * | 2/2004 | Matsufuji et al. | 428/212 |
| 6,693,746 B1 * | 2/2004 | Nakamura et al. | 359/580 |
| 6,773,121 B2 * | 8/2004 | Miyatake et al. | 359/601 |
| 6,777,070 B1 * | 8/2004 | Murata et al. | 428/323 |
| 6,778,240 B2 * | 8/2004 | Nakamura et al. | 349/112 |
| 6,791,649 B1 * | 9/2004 | Nakamura et al. | 349/137 |
| 6,844,403 B2 * | 1/2005 | Oshima et al. | 526/171 |
| 6,917,400 B2 * | 7/2005 | Nakamura et al. | 349/96 |
| 2001/0030808 A1 * | 10/2001 | Komatsu et al. | 359/507 |
| 2004/0013892 A1 * | 1/2004 | Yano et al. | 428/482 |

FOREIGN PATENT DOCUMENTS

| | | | |
|---|---|---|---|
| JP | 11-64601 A | | 3/1999 |
| JP | 2000-111706 A | | 4/2000 |
| JP | 2001-350002 | * | 12/2001 |
| JP | 2002-328202 A | | 11/2002 |
| JP | 2003-119052 A | | 4/2003 |

OTHER PUBLICATIONS

J.H. Simmons et al.; Journal of Non-Crystalline Solids, vol. 178, pp. 166-175, 1994.

* cited by examiner

OPTICAL MULTILAYER FILM, POLARIZING PLATE AND OPTICAL PRODUCT

TECHNICAL FIELD

This invention relates to an optical multilayer film. More particularly it relates to an optical multilayer film having a low refractive index layer exhibiting a reduced reflectivity with enhanced efficiency, which is useful as an antireflection protective film provided in an optical member, or a polarizing plate-protecting film. The invention further relates to a polarizing plate having an antireflection function using the optical multilayer film, and to an optical product provided with this polarizing plate.

BACKGROUND ART

A polarizing film of a liquid crystal display (hereinafter abbreviated to as "LCD" when appropriate) is often treated to provide with a low refractive index layer for preventing or minimizing mirroring. An enhanced antireflection performance is required especially for a polarizing film of LCD used in the fields. For this requirement, a low refractive index layer comprised of a multilayer film or a single layer film is formed on a base film for a polarizing film.

The multilayer film for a low refractive index layer includes, for example, a multilayer film comprising a film of a relatively high refractive index and a film of relatively low refractive index, laminated in this order (for example, see Japanese Unexamined Patent Publication [hereinafter referred to as "JP-A"] No. H4-357134).

The process for forming a film includes, for example, a sol-gel process, a vacuum deposition process, a sputtering process and a chemical vapor deposition process. These processes comprise a step of exposing to a high temperature or placing in vacuum. At a high-temperature exposing step, a resin base film is liable to be distorted or modified and optical properties thereof tend to be varied. Thus, an antireflection film having desired properties is difficult to make. In a vacuum film-forming process, gas is inevitably released from a base resin material in a vacuum apparatus and thus, a high degree of vacuum is difficult to obtain, and an antireflection film having desired properties is difficult to make.

In the case when a low refractive index layer is comprised of two or more films, two or more coating operations for forming films are required and therefore the film-forming process is troublesome and costly. Further, the film thickness is difficult to control and therefore the desired low light reflection is difficult to attain.

As a process for forming a low refractive index layer comprising a single layer film, there have been proposed a process wherein a metal oxide film comprising multi-metal ingredients is formed on a glass pane by a sol-gel process, the metal oxide film is heated to be thereby separated into two phases, and then the film is subjected to etching by using hydrofluoric acid whereby the film is rendered porous due to difference of the etching rate of the two phases (see, for example, S. P. Mukherjee et al, J. Non-Cryst. Solids. Vol. 48, p 177(1982)), and a process wherein a composite film comprised of magnesium oxide and carbon dioxide is formed by a solo-gel process, and then, the composite film is exposed to a fluorine-containing gas at a high temperature whereby oxygen is substituted by fluorine (see, for example, J. H. Simmons et al, J. Non-Cryst. Solids, Vol. 178, p 166(1994)).

JP-A 2002-328,202 describes a process for making a low reflective resin base material wherein a surface of a resin base material is coated with a coating liquid containing at least one kind of organic silicon compound comprising an amino group-containing organic silicon compound, or its hydrolyzed product; the coating liquid is dried to form a first film on the resin base material; and then a silicon dioxide film having a refractive index of not larger than 1.40 and having a rough surface is formed on the first film. It is described in this patent publication that the films can be formed at a low temperature and at a time with enhanced adhesion onto the entire surface of the resin base material at a low temperature.

However, in the case when the low reflective resin base material described in the above-mentioned patent publication is applied to a liquid crystal device, the resulting liquid crystal device tends to exhibit poor visibility, i.e., small luminance, and a low contrast. Therefore, improvement of these properties is eagerly desired.

DISCLOSURE OF THE INVENTION

[Problems to Be Solved by the Invention]

In view of the foregoing, a primary object of the present invention is to provide an optical multilayer film characterized as having a low light reflection, a reduced glare and mirroring, an enhanced visibility, and, when it is applied to a liquid crystal device, providing a liquid crystal device having an improved contrast.

[Means For Solving the Problems]

Thus, in accordance with the present invention, there are provided the following optical multilayer films, polarizing plate and optical product.

(1) An optical multilayer film comprising a hard coat layer and a low refractive index layer comprising aerogel, which layers are laminated, in this order, directly or with another intervening layer on one surface of a base film comprising a transparent resin, wherein the refractive index $n_H$ of the hard coat layer and the refractive index $n_L$ of the low refractive index layer satisfy the following three formulae [1], [2] and [3], $$n_L \leq 1.37 \quad \text{Formula [1]}$$

$$n_H \geq 1.53 \quad \text{Formula [2]}$$

$$(n_H)^{1/2} - 0.2 < n_L < (n_H)^{1/2} + 0.2. \quad \text{Formula [3]}$$

(2) The optical multilayer film according to (1), wherein the refractive index $n_H$ of the hard coat layer and the refractive index $n_L$ of the low refractive index layer satisfy the following three formulae [4], [5] and [6], $$1.25 \leq n_L \leq 1.35 \quad \text{Formula [4]}$$

$$n_H \geq 1.55 \quad \text{Formula [5]}$$

$$(n_H)^{1/2} - 0.15 < n_L < (n_H)^{1/2} + 0.15 \quad \text{Formula [6]}$$

(3) The optical multilayer film according to (1) or (2), which has a reflectivity of not larger than 0.7% at a wavelength of 550 nm and a reflectivity of not larger than 1.5% at a wavelength in the range of 430 nm to 700 nm.

(4) The optical multilayer film according to any one of (1) to (3), wherein the base film has a die line with a depth or height of not larger than 0.1 μm.

(5) The optical multilayer film according to any one of (1) to (4), wherein the transparent resin is selected from the group consisting of a polymer resin having an alicyclic structure, a cellulose resin and a polyester resin.

(6) The optical multilayer film according to any one of (1) to (4), wherein the transparent resin is a polymer resin having an alicyclic structure.

(7) The optical multilayer film according to any one of (1) to (6), which is an antireflection protective film provided in an optical member.

(8) The optical multilayer film according to claim 7, which is a polarizing plate-protecting film.

(9) A polarizing plate having an antireflection function comprising the polarizing plate-protecting film as mentioned in (8), which further has a polarizing film laminated on the surface of the polarizing plate-protecting film, opposite to the surface on which the low refractive index layer is formed.

(10) An optical product provided with the polarizing plate having an antireflection function as mentioned in (9).

[Effect of the Invention]

According to the present invention, there can be provided an optical multilayer film characterized as having a low light reflection, a reduced glare and mirroring, an enhanced visibility, and, when it is applied to a liquid crystal device, providing a liquid crystal device having an improved contrast.

BEST MODE FOR CARRYING OUT THE INVENTION

Figure 1:
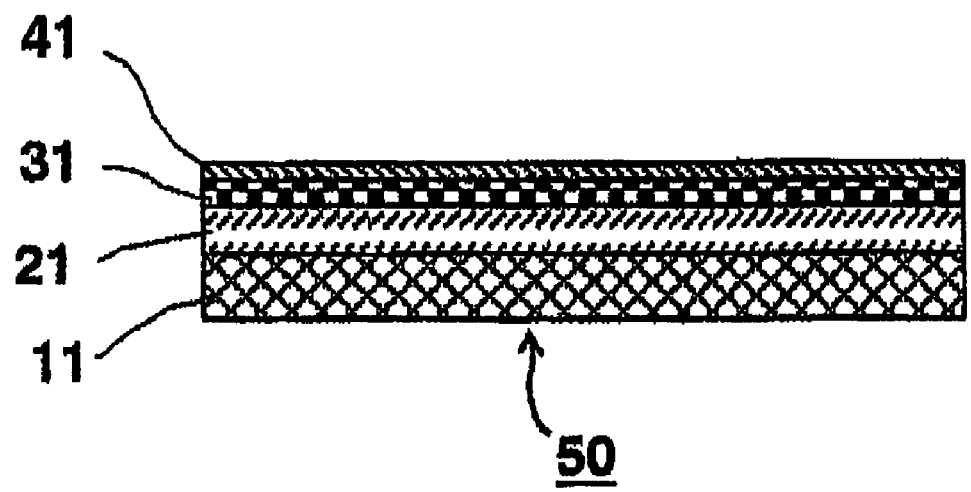
FIG. 1 is a cross-sectional view illustrating the multilayer structure of an optical multilayer film of the present invention.

A transparent resin used for a base film of the optical multilayer film of the present invention exhibits a total luminous transmittance of at least 80% at a film thickness of 1 mm. The kind of the transparent resin is not particularly limited, and, as examples thereof, there can be mentioned polymers having an alicyclic structure, polyolefins such as polyethylene and polypropylene, polycarbonates, polyesters, polysulfones, polyether-sulfones, polystyrene and other styrenic polymers, polyvinyl alcohol, acyl-modified celluloses, polyvinyl chloride and polymethacrylates. These polymers may be used either alone or as a combination of at least two thereof. Of these, acyl-modified celluloses such as diacetyl cellulose, propionyl cellulose, triacetyl cellulose and butyryl cellulose; polyesters such as polyethylene terephthalate, polybutylene terephthalate and polyethylene naphthalate; and polymers having an alicyclic structure are preferable because of good transparency and small refractive index. Triacetyl cellulose, polyethylene terephthalate and polymers having an alicyclic structure are more preferable in view of good transparency and light-weight. Polyethylene terephthalate and polymers having an alicyclic structure are especially preferable because of enhanced dimensional stability and film-thickness controllability.

The polymers having an alicyclic structure include those which have an alycyclic structure on their backbone chain and/or branched chains. Of these, polymers having an alicyclic structure on the backbone chain are preferable because of high mechanical strengths and good heat resistance.

The alicyclic structure includes saturated alicyclic hydrocarbon structure (i.e., cycloalkane structure), and unsaturated alicyclic hydrocarbon structure (i.e., cycloalkene structure), and others. Of these, cycloalkane structure and cycloalkene structure are preferable. Cycloalkane structure is most preferable. The number of carbon atoms in the alicyclic structure is not particularly limited, but the number of carbon atoms is usually in the range of 4 to 30, preferably 5 to 20, and more preferably 5 to 15. When the number of carbon atoms is in these ranges, the film exhibits good and well-balanced mechanical strength, heat resistance and film-forming property. The content of repeating units having an alicyclic structure in the polymers having an alicyclic structure can be appropriately chosen depending upon the particular use of the optical multilayer film, but the content thereof is preferably at least 30% by weight, more preferably at least 50% by weight, especially preferably at least 70% by weight and most preferably at least 90% by weight. When the base resin material used contains such a large amount of alicyclic structure, the base film has high transparency and heat resistance.

The polymers having an alicyclic structure include (1) norbornene polymers, (2) monocyclic cycloolefin polymers, (3) cyclic conjugated diene polymers, (4) vinyl alicyclic hydrocarbon polymers, and hydrogenation products of these polymers. Of these, norbornene polymers are especially preferable because of enhanced transparency and shapability.

As specific examples of the norbornene polymers, there can be mentioned ring-opened polymers of norbornene monomers, ring-opened copolymers of norbornene monomers with other ring-opening copolymerizable monomers, and hydrogenation products of these ring-opened polymers and copolymers; and addition polymers of norborne monomers, and addition copolymers of norbornene monomers with other copolymerizable monomers. Of these, hydrogenation products of ring-opened polymers of norbornene monomers and hydrogenation products of ring-opened copolymers of norbornene monomers with other copolymerizable monomers are especially preferable because of excellent transparency.

The polymers having an alicyclic structure as used can be selected from those which are known to a person skilled in the art, as described in, for example, JP-A 2002-321302.

The transparent resin used for the base film preferably has a glass transition temperature of at least 80° C., more preferably in the range of 100° C. to 250° C. The transparent resin having such a high glass transition temperature gives a base film exhibiting enhanced resistance to distortion or stress cracking at a high temperature, and having improved durability.

The transparent resin used for the base film usually has a weight average molecular weight (Mw) in the range of 10,000 to 100,000, preferably 25,000 to 80,000 and more preferably 25,000 to 50,000, as measured by gel permeation chromatography (hereinafter abbreviated to as "GPC") using cyclohexane as solvent (when the polymer is insoluble in cyclohexane, toluene is used instead) and expressed in terms of the Mw of polyisoprene or polystyrene. When the weight average molecular weight falls in this range, the base film has good and well balanced mechanical strength, and capability and processability.

The distribution of molecular weight of the transparent resin as expressed by the ratio of weight average molecular weight (Mw) to number average molecular weight (Mn) is not particularly limited, but is usually in the range of 1.0 to 10.0, preferably 1.0 to 4.0 and more preferably 1.2 to 3.5.

The base film used for an optical multilayer film of the present invention may comprise additive ingredients in addition to the transparent resin. The additive ingredients include, for example, inorganic fine particles; stabilizers such as an antioxidant, a heat stabilizer, a light stabilizer, a weathering agent, an ultraviolet absorber and a near-infrared-rays stabilizer; resin modifiers such as a lubricant and a plasticizer; colorants such as a dye and a pigment; and an antistatic agent. These additive ingredients may be used either alone or as a combination of at least two thereof. The amount of additive ingredients can be appropriately chosen within the range in which the object of the present invention can be achieved, but, the amount thereof is usually in the range of 0 to 5 parts by weight, preferably 0 to 3 parts by weight, based on 100 parts by weight of the transparent resin.

The base film preferably has a thickness in the range of 30 to 300 µm, more preferably 40 to 200 µm in view of the mechanical strength and other characteristics.

The thickness of the base film is preferably uniform. More preferably the fluctuation in film thickness is below 3% based on the average film thickness over the entire film width. When the film thickness fluctuation is below 3%, the adhesion of a hard coat layer and the surface smoothness of a low refractive index layer formed on the hard coat layer can be enhanced.

The die line of the base film preferably has a depth of height of below 0.1 µm, more preferably 0.05 µm. By reduction of the depth of height of die line, when the optical multilayer film of the present invention is used as a polarizing plate-protective film, a die line observed is minimized and visibility is greatly improved.

The die line can be measured by a non-contact three-dimensional surface configuration and roughness tester.

The content of volatile matter in the base film is preferably not larger than 0.1% by weight, more preferably not larger than 0.05% by weight. When the content of volatile matter is minimized, the base film has good dimensional stability and, when a hard coat layer is laminated, a laminate of uniform thickness can be obtained. In addition, a homogeneous low refractive index layer can be formed over the entire surface of film, and thus, the resulting antireflection effect can be uniform over the entire surface of film.

The volatile matter is substances having a molecular weight of not larger than 200 contained in a very minor amount in the base film. The volatile matter includes, for example, residual monomers and solvent. The content of volatile matter can be determined as the total amount of substances having a molecular weight of not larger than 200 by analysis of the base film according to gas chromatography.

The base film preferably has a saturated water absorption of not larger than 0.01% by weight, more preferably not larger than 0.007% by weight. When the saturated water absorption is larger than 0.01% by weight, the adhesion between the base film and a hard coat layer, and the adhesion between the hard coat layer and a low refractive index layer are reduced, and the adhered low refractive index layer is liable to be separated during the long-term use.

The saturated water absorption is determined by measuring the weight increase as immersed in water at 23° C. for 1 week according to ASTM D530.

Either one surface or both surfaces of the base film can be modified to enhance the adhesion thereof to a hard coat layer. The surface modification includes, for example, an energy radiation treatment and a chemical treatment.

As specific examples of the energy radiation treatment, there can be mentioned a corona discharge treatment, a plasma treatment, an electron radiation treatment and an ultraviolet ray radiation treatment. In view of the irradiation efficiency, a corona discharge treatment and a plasma treatment are preferable. A corona discharge treatment is especially preferable.

A preferable chemical treatment comprises the step of immersing the base film in an aqueous potassium bichromate solution or an aqueous solution of an oxidizing agent such as concentric sulfuric acid, followed by thorough washing with water. When the base film is shaken during immersion in the aqueous solution, the immersion effect is enhanced. The treatment time can be appropriately chosen depending upon the particular reactivity and concentration of a chemical used or other conditions. When the time of the chemical treatment is too long, the surface of base film is undesirably dissolved and the transparency is reduced.

The base film can be formed by a solution-casting method or a melt-extrusion method. A melt-extrusion method is preferable because the content of volatile matter in the base film is reduced and the uniformity in thickness is enhanced. The melt-extrusion method includes a method using a T-die and an inflation method. A method using a T-die is especially preferable because of high productivity and high precision of film thickness.

In the melt-extrusion method using a T-die, the transparent resin is heated in an extruder with a T-die preferably at a melt temperature by 80 to 180° C. higher than the glass transition temperature of the transparent resin, more preferably by 100 to 150° C. higher than the glass transition temperature of the transparent resin. When the melting temperature is too low, the transparent resin has too low fluidity. In contrast, when the melting temperature is too high, the deterioration of resin tends to occurs.

The depth of height of a die line in the base film used in the present invention can be 0.1 µm or lower, for example, by the following methods: (1) a method using a T-die having a die lip, a tip end portion of which is plated with chromium, nickel or titanium; (2) a method using a T-die having a die lip, the inner surface of which is lined with a coating film of TiN, TiAlN, TiC, CrN or DLC (diamond-like carbon), formed, for example, by PVD (physical vapor deposition); (3) a method using a T-die having a die lip, a tip end portion of which is thermally sprayed with other ceramic; and (4) a method using a T-die having a die lip, the surface of a tip end portion of which is nitrified.

The dies used in the above-mentioned methods have a hard surface and a low friction with a resin. Therefore, the undesirable incorporation of burned matter can be prevented and the depth or height of die line can be 0.1 µm or lower.

By using a die having a good surface precision, the uniformity of thickness can be more enhanced. The surface roughness concerned with microscopic roughness is expressed by the average height Ra. The inner surface of the die, especially the inner surface of a tip end portion of the die, preferably has an average height Ra of not larger than 0.2 µm, more preferably not larger than 0.1 µm.

By the term "average height Ra" as used herein, we mean an average value as determined by a determining method similar to the arithmetic mean height Ra as stipulated in JIS B601-2001. In the determining method, a curve to be evaluated is processed with a phase compensation high pass filter at a cut-off of 0.8 mm to draw a roughness curve, and a predetermined standard length is taken from the average line of the roughness curve. Absolute values of deviations from the roughness curve to the average line per the standard length are integrated, and an average value is calculated.

The depth or height of a die line in the base film used in the present invention can be 0.1 μm or lower, for example, by other means. Such means include, for example, removal of, for example, burnt matter or foreign matter from a die lip; enhancement of releasability of resin film from a die lip; enhancement of uniformity in wettability over the entire surface of a die lip; minimization of the content of oxygen in resin pellets and/or the amount of powdery resin deposited on the pellets; and use of an extruder provided with a filter for resin.

The content of volatile matter in the base film can be reduced, for example, by the following means: (1) using a transparent resin having a reduced amount of volatile matter; (2) employing a melt-extrusion method for forming the base film; and (3) preliminarily drying a transparent resin before shaping the transparent resin. The preliminary drying can be carried out, for example, by heating pellets of a transparent resin by a hot air dryer. The heat-drying temperature is preferably at least 100° C. and the heat-drying time is preferably at least two hours. By the preliminary drying, the content of volatile matter in the base film is reduced and undesirable foaming of the molten transparent resin occurring during melt extrusion can be prevented.

The hard coat layer in an optical multilayer film of the present invention is formed from a material having a hardness of at least 2H as measured by a pencil hardness testing method using a glass testing plate according to JIS K5600-5-4. The material used is not particularly limited provided that it has such a pencil hardness. As specific examples of the material, there can be mentioned organic hard coating materials such as an organic silicone resin, a melamine resin, an epoxy resin, an acrylic resin and a urethane-acrylate resin; and inorganic hard coating materials such as silicon dioxide. Of these, a urethane-acrylate resin and a polyfunctional acrylate resin are preferable because of high adhesion and high productivity.

In the present invention, to provide an optical multilayer film having a reduced light reflection and a good abrasion resistance, the refractive index $n_H$ of the hard coat layer, and the refractive index $n_L$ of the low refractive index layer, formed on the hard coat layer, must satisfy the following two formulae [2] and [3], $n_H \geq 1.53$ <span></span> Formula [2]

$\sqrt{n_H}-0.2 < n_L < \sqrt{n_H}+0.2,$ <span></span> Formula [3]

and preferably satisfy the following two [5] and [6], $n_H \geq 1.55$ <span></span> Formula [5]

$\sqrt{n_H}-0.15 < n_L < \sqrt{n_H}+0.15$ <span></span> Formula [6]

If desired, various fillers can be incorporated in the hard coat layer, for example, to modify the hard coat layer, for example, to control the refractive index, improve the flexural modulus, stabilize the volume shrinkage, and improve the heat resistance, antistatic property and antiglare property. The fillers include, for example, silica, alumina and hydrated alumina. Further, additives such as an antioxidant, a ultraviolet absorber, a light stabilizer, an antistatic agent, a leveling agent and a defoaming agent can be incorporated.

As preferable examples of the fillers for controling the refractive index and antistatic property, there can be mentioned titanium oxide, zirconium oxide, zinc oxide, tin oxide, cerium oxide, antimony pentaoxide, tin-doped indium oxide (ITO), antimony-doped tin oxide (IZO), aluminum-doped zinc oxide (AZO) and fluorine-doped tin oxide (FTO). When these fillers are incorporated, the refractive index and antistatic property of the hard coat layer can be easily controlled. Of these, antimony pentaoxide, ITO, IZO, ATO and FTO are especially preferable because these do not influence or influence only to a negligible extent the transparency of film. These fillers have a primary particle diameter of at least 1 nm, and not larger than 100 nm, preferably not larger than 30 nm.

The fillers for imparting an antiglare property preferably include those which have an average particle diameter in the range of 0.5 to 10 μm, more preferably 1 to 7 μm. As specific examples of the antiglare-imparting fillers, there can be mentioned organic resin fillers such as a polymethyl methacrylate resin, a vinylidene fluoride resin and other fluororesins, a silicone resin, an epoxy resin, a nylon resin, a polystyrene resin, a phenol resin, a polyurethane resin, a crosslinked acrylic resin, a crosslinked polystyrene resin, a melamine resin and a benzoguanamine resin; and inorganic fillers such as titanium oxide, aluminum oxide, indium oxide, zinc oxide, antimony oxide, tin oxide, zirconium oxide, ITO, magnesium fluoride and silicon oxide.

The procedure for forming the hard coat layer is not particularly limited, and the hard coat layer can be formed, for example, by a procedure wherein a base film is coated with a coating liquid for forming the hard coat layer by a conventional procedure, and the coating is cured by heating or irradiation with ultraviolet rays.

The hard coat layer preferably has a thickness in the range of 0.5 to 30 μm, more preferably 3 to 15 μm. If the hard coat layer is too thin, it is difficult to prepare a multilayer having a layer or layers of a desired hardness, formed on the hard coat layer. In contrast, if the hard coat layer is too thick, the resulting optical multilayer film has poor flexibility, and it needs a substantially long time to cure the hard coat layer, and the production efficiency tends to be reduced.

The low refractive index layer of the optical multilayer film of the present invention is comprised of aerogel. The aerogel used is not particularly limited provided that the refractive index $n_L$ of the low refractive index layer satisfies the following formulae [1] and [3], $n_L \leq 1.37$ <span></span> Formula [1]

$\sqrt{n_H}-0.2 < n_L < \sqrt{n_H}+0.2$ <span></span> Formula [3]

wherein $n_H$ is a refractive index of the hard coat layer. Preferably the refractive index $n_L$ of the low refractive index layer satisfies the following formulae [4] and [6], $1.25 \leq n_L \leq 1.35$ <span></span> Formula [4]

$\sqrt{n_H}-0.15 < n_L < \sqrt{n_H}+0.15$ <span></span> Formula [6]

The low refractive index layer may be composed of a single layer or a multilayer. In the case when the low refractive index layer is composed of a multilayer, the layer of the multilayer adjacent to the hard coat layer should have a refractive index $n_L$ satisfying the above-mentioned formulae.

Aerogel is a transparent porous body having bubbles dispersed in a matrix. The predominant part of the bubbles have a diameter of not larger than 200 nm, and the content of the bubbles is usually in the range of 10 to 60% by volume, preferably 20 to 40% by volume.

As specific examples of the aerogel, there can be mentioned silica aerogel and a porous body having hollow particles dispersed in a matrix.

Silica aerogel can be produced by processes described in U.S. Pat. Nos. 4,402,927, 4,432,956 and 4,610,863, wherein an alkoxysilane is hydrolyzed and polymerized to give a gel-like compound having a silica backbone in a wet state, and the gel-like compound is dried in a solvent (i.e., dispersion medium) such as an alcohol or carbon dioxide in a supercritical state exceeding the critical point. The drying in a supercritical state can be carried out, for example, by immersing the wet gel-like compound in liquid carbon dioxide whereby a part or the whole of the solvent contained in the wet gel-like compound is substituted by liquid carbon dioxide having a critical point lower than that of the solvent, and then, the gel-like compound is dried in a single medium comprised of carbon dioxide or a mixed medium comprised of carbon dioxide and a solvent under supercritical conditions. Silica aerogel can also be produced by processes described in U.S. Pat. Nos. 5,137,279 and 5,124,364 wherein silica aerogel is produced from sodium silicate by a procedure similar to that described above.

As described in JP-A H5-279011 and JP-A H7-138375, the wet gel-like compound produced by hydrolyzing and polymerizing an alkoxysilane in the above-mentioned processes are preferably treated so as to render hydrophobic the wet gel-like compound. The thus-produced hydrophobic silica aerogel is characterized in that moisture or water does not easily penetrate into the silica aero gel and therefore the refractive index and light transmittance of silica aerogel are not deteriorated.

The treatment for imparting a hydrophobic property to the silica aerogel can be conducted before or during the drying under supercritical conditions. This treatment of imparting a hydrophobic property involves a reaction of hydroxyl groups in the silanol groups present on the surface of gel-like compound with functional groups of a hydrophobicity-imparting agent whereby the hydroxyl groups are substituted by the functional groups of the hydrophobicity-imparting agent. The procedure for hydrophobicity-imparting treatment comprises immersing the gel-like compound in a solution of the hydrophobicity-imparting agent in a solvent and stirring the mixed solution so that the gel-like compound is impregnated with the hydrophocity-imparting agent, and then, if desired, the gel-like compound is heated, whereby a hydrophobicity-imparting reaction of substituting hydroxyl groups by hydrophobic functional groups is caused.

The solvent used in the hydrophobicity-imparting treatment includes, for example, methanol, ethanol, isopropanol, xylene, toluene, benzene, N,N-dimethylformamide and hexamethyldisiloxane. The solvent used in not particularly limited provided that the hydrophobicity-imparting agent is easily soluble in the solvent, and a solvent contained in the gel-like compound is capable of being substituted by the solvent.

The drying under supercritical conditions is carried out in a medium in which the supercritical drying can easily be effected, which includes, for example, methanol, ethanol, isopropanol and liquid carbon dioxide, and those which are capable of being substituted by these solvents.

As specific examples of the hydrophobicity-imparting agent, there can be mentioned hexamethyldisilazane, hexamethyldisiloxane, trimethylmethoxysilane, dimethyldimethoxysilane, methyltrimethoxysilane, ethyltrimethoxysilane, trimethyl-ethoxysilane, dimethyldiethoxysilane and methyltriethoxysilane.

The refractive index of the silica aerogel can be voluntarily changed by varying the particular ratio of the raw material for silica aero gel.

The procedure for forming the low refractive index layer comprised of silica aerogel is not particularly limited, and, a procedure can be employed wherein the hard coat layer is coated with the above-mentioned gel-like compound by the conventional procedure and then the thus-formed coating is dried under supercritical conditions. A hydrophobic treatment can be conducted before or during the drying in the supercritical state. The drying in a supercritical state can be carried out, for example, by immersing the gel-like compound in liquid carbon dioxide whereby a part or the whole of the solvent contained in the gel-like compound is substituted by liquid carbon dioxide having a critical point lower than that of the solvent, and then, the gel-like compound is dried in a single medium comprised of carbon dioxide or a mixed medium comprised of carbon dioxide and a solvent under supercritical conditions.

The porous body comprising hollow fine particles dispersed in a matrix includes those which are porous bodies having fine hollow particles having a void within each fine particle, dispersed in a binder resin, as described in JP-A 2001-233611 and JP-A 2003-149642.

The binder resin is selected from those in which hollow particles are well dispersed, and which give a porous body having good transparency and high tensile strength. As specific examples of the resin binder, there can be mentioned conventional resins such as a polyester resin, an acrylic resin, a urethane resin, a vinyl chloride resin, an epoxy resin, a melamine resin, a fluororesin, a silicone resin, a butyral resin, a phenol resin, a vinyl acetate resin, an ultraviolet-curable resin, an electron rays-curable resin, an emulsion resin, a water-soluble resin, a hydrophilic resin, and mixtures of these resins, and resins for coating, including copolymer resins prepared from monomers for the above-recited resins, and modified resin of the above-recited resins. Further, hydrolysable organic silicon compounds such as an alkoxysilane, and hydrolyzed products thereof can be mentioned.

Of these, an acrylic resin, an epoxy resin, a urethane resin, a silicone resin, and a hydrolyzable organic silicon compound and a hydrolyzed product thereof are preferable.

In the case when a porous body having hollow fine particles dispersed in a matrix is used as a low refractive index layer in the present invention, a fluororesin can be incorporated in the above-mentioned resin to enhance the antireflection property and the anti-staining property.

The fluororesin used is not particularly limited provided that the fluororesin is comprised of an amorphous fluoropolymer which does not exhibit light-scattering due to crystal, to any appreciable extent. Especially amorphous fluoroolefin copolymers such as a tetrafluoroethylene (37–48% by weight)/-vinylidene fluoride (15–35% by weight)/hexafluoropropylene (26–44%) terpolymer, and polymers having a fluorine-containing cycloaliphatic structure are preferable in view of good mechanical characteristics.

The hydrolysable organic silicon compound such as an alkoxysilane, and a hydrolyzed product thereof are at least one compound selected from the following (a), (b) and (c) and have a bond represented by —(O—Si)$_m$—O— where m is a natural number:

(a) at least one kind of a compound represented by formula (i): SiX$_4$ (hereinafter referred to as compound (i)), (b) at least one kind of a product (hereinafter referred to as "compound (ii)") prepared by partial hydrolysis of compound (i), and (c) a product (hereinafter referred to as "compound (iii)") prepared by complete hydrolysis of compound (i).

In compound (i) in the above (a), X is a halogen atom such as chlorine atom or an bromine atom; a univalent hydrocarbon group which may have a substituent; an oxygen atom; an organic acid residue such as an acetic acid residue or a nitric acid residue; β-diketonato group such as acetylacetonato; an alkoxy group such as a methoxy group, an ethoxy group, an n-propoxy group and an n-butoxy group; or a hydroxyl group.

Among the compounds represented by formula (i), organic silicon compounds represented by the formula (i)-1: $R_aSiY_{4-a}$ (hereinafter referred to as compound (i)-1, where R is a univalent hydrocarbon group which may have a substituent, a is an integer of 0 to 2, when "a" is 2, the two "a" a may be the same or different) are preferable.

As specific examples of the univalent hydrocarbon group which may have a substituent, there can be mentioned alkyl groups such as methyl, ethyl, propyl, butyl, pentyl, hexyl, heptyl and octyl groups; cycloalkyl groups such as cyclopentyl and cyclohexyl groups; aryl groups which may have a substiturent, such as phenyl, 4-methylphenyl, 1-naphthyl and 2-naphthyl groups; alkenyl groups such as vinyl and allyl groups; aralkyl groups such as benzyl, phenethyl and 3-phenylpropyl groups; haloalkyl groups such as chloromethyl and γ-chloropropyl groups; perfluoroalkyl groups such as 3,3,3-trifluoropropyl, methyl-3,3,3-trifluoropropyl, heptadecafluorodecyl, trifluoropropyl and tridecafluorooctyl groups; alkenylcarbonyloxyalkyl groups such as γ-methacryloxypropyl group; alkyl groups having an epoxy group such as γ-glycidoxypropyl and 3,4-epoxycyclohexylethyl groups; alkyl groups having a mercapto group such as γ-mercaptopropyl group; and alkyl groups having an amino group such as 3-aminopropyl group. Of these, alkyl groups having 1 to 4 carbon atoms, a perfluoralkyl group and a phenyl group are preferable because of ease in synthesis, commercially availability and low reflection property.

In the above-mentioned formula (i)-1, Y is a hydrolysable group. By the term "hydrolysable group" as used herein, we mean a group capable of being hydrolyzed, if desired, in the presence of an acid or base catalyst, to form a bond $-(O-Si)_m-O-$.

As specific examples of the hydrolysable group Y, there can be mentioned alkoxy groups such as methoxy, ethoxy and propoxy groups; acyloxy groups such as acetoxy and propionyloxy groups; oxime groups (—O—N═C—R' (R")), enoxy groups (—O—C(R')═C(R")R'''), an amino group, aminoxy groups (—O—N(R')R" and amido groups (—N(R')—C(═O)—R"). In these groups, R', R" and R''' independently represent a hydrogen atom or a univalent hydrocarbon group. Preferably Y is an alkoxy group in view of enhanced commercially availability.

Among the compounds of formula (i)-1, silicone compounds wherein "a" is an integer of 0 to 2 are preferable. As specific examples of the silicone compounds, there can be mentioned alkoxysilanes, acetoxysilanes, oximesilanes, enoxysilanes, aminosilanes, aminoxysilanes, aminosilanes and amidosilane. Of these, alkoxysilanes are preferable because of enhanced commercial availability.

As specific examples of the compounds of formula (i)-1 wherein "a" is zero, i.e., tetraalkoxysilanes, there can be mentioned tetramethoxysilane and tetraethoxysilane. As specific examples of the compounds of formula (i)-1 wherein "a" is 1, i.e., organotrialkoxysilanes, there can be mentioned methyltrimethoxysilane, methyltriethoxysilane, methyltriisopropoxysilane, phenyltrimethoxysilane, phenyltriethoxysilane and 3,3,3-trifluoropropyltrimethoxysilane. As specific examples of the compounds of formula (i)-1 wherein "a" is 2, i.e., diorganodialkoxysilanes, there can be mentioned dimethyldimethoxysilane, dimethyldiethoxysilane, diphenyldimethoxysilane, diphenyldiethoxysilane and methylphenyldimethoxysilane.

The molecular weight of compound (i)-1 is not particularly limited, but is preferably in the range of 40 to 300 and more preferably 100 to 200.

Compound (ii) which is at least one kind of product prepared by partial hydrolysis of compound (i), and at least one kind of compound (iii) which is a product prepared by complete hydrolysis of compound (i), are obtained by a procedure wherein at least one kind of compound (i) is completely or partially hydrolyzed and condensed.

More specifically compound (ii) and compound (iii) can be obtained, for example, by a procedure wherein a metal tetraalkoxide such as that represented by the formula $Si(Or)_4$ where "r" represents a univalent hydrocarbon group is hydrolyzed in the presence of water in an amount such that the ratio $[H_2O]/[Or]$ by mole is at least 1.0, for example, in the range of 1.0 to 5.0, and preferably 1.0 to 3.0. The hydrolysis can be carried out at a temperature in the range of 5 to 100° C. for 2 to 100 hours while the entire hydrolysis mixture is stirred.

When compound (i) is hydrolyzed, a catalyst can be used, if desired. The catalyst used is not particularly limited, but an acid catalyst is preferable because the resulting partially and/or completely hydrolyzed product tends to have a two-dimensional crosslinked structure and a condensed product formed from the crosslinked structure easily becomes porous, and the time required for hydrolysis can be shortened.

The acid catalyst used is not particularly limited, and, as specific examples thereof, there can be mentioned organic acids such as acetic acid, chloroacetic acid, citric acid, benzoic acid, dimethylmalonic acid, formic acid, propionic acid, glutaric acid, glycolic acid, maleic acid, malonic acid, toluenesulfonic acid and oxalic acid; inorganic acids such as hydrochloric acid, nitric acid and a silane halide; and acidic sol-like fillers such as acidic colloidal silica and oxidized titania sol. These acid catalysts may be used either alone or as a combination of two or more.

Instead of the above-mentioned acid catalyst, a base catalyst such as an aqueous solution of alkali metal hydroxide or alkaline earth metal hydroxide, such as sodium hydroxide and calcium hydroxide; and aqueous ammonia and an aqueous amine solution may be used.

The molecular weights of compound (ii) and compound (iii) are not particularly limited, but the weight average molecular weight are usually in the range of 200 to 5,000.

The hollow fine particles are not particularly limited, provided that they are particles of an inorganic compound. However, the hollow fine particles are preferably inorganic hollow fine particles each having a shell with small void formed within the shell. Silica hollow fine particles are especially preferable.

The inorganic compound is usually an inorganic oxide. As specific examples of the inorganic oxide, there can be mentioned $SiO_2$, $Al_2O_3$, $B_2O_3$, $TiO_2$, $ZrO_2$, $SnO_2$, $Ce_2O_3$, $P_2O_3$, $Sb_2O_3$, $MoO_3$, $ZnO_2$ and $WO_3$. These inorganic oxides may be used either alone or as a combination of at least two thereof. As specific examples of the combination of at least two thereof, there can be mentioned $TiO_2$—$Al_2O_3$, $TiO_2$—$ZrO_2$, $In_2O_3$—$SnO_2$ and $Sb_2O_3$—$SnO_2$. These inorganic oxide combinations may be used either alone or in combination.

The inorganic hollow fine particles include those which have (A) a single layer of an inorganic compound, (B) a single layer of a composite oxide comprised of at least two different kinds of metal oxides, or (C) a double layer comprising the layers (A) and (B).

The shell of the hollow fine particles may be composed of either a porous material having interconnecting pores, or a porous material having closed pores which interrupt the connection of the inner void to the outside of shell.

The shell preferably comprises a first, inner inorganic oxide coating layer and a second, outer inorganic oxide layer. By the provision of the second, outer coating layer, the pores within the shell are closed and the shell becomes dense, and the inner void is closed. In the case when the second outer coating layer is made of a fluorine-containing organic silicon compound, the second outer coating layer contains fluorine, and therefore, the hollow fine particles have more reduced refractive index and enhanced dispersibility in an organic solvent, and the resulting low refractive index layer exhibits enhanced stain resistance. As specific examples of the fluorine-containing silicon compound, there can be mentioned 3,3,3-trifluoropropyltrimethoxysilane, methyl-3,3,3-trifluoropropyldimethoxysilane, heptadecafluorodecylmethyldimethoxysilane, heptadecafluorodecyltrichlorosilane, heptadecafluorodecyltrimethoxysilane, trifluoropropyltrimethoxysilane and tridecafluoroctyltrimethoxysilane.

The shell preferably has a thickness of 1 to 50 nm, especially preferably 5 to 20 nm. If the shell thickness is smaller than 1 nm, the inorganic hollow fine particles are liable to have poor shape-retention. In contrast, if the shell thickness is larger than 50 nm, the pores within the shell tend to become very small, and thus, the proportion of the pores is reduced and the refractive index of low refractive index layer is not sufficiently reduced. The thickness of shell is preferably in the range of 1/50 to 1/5 of the average particle diameter of the inorganic hollow fine particles.

In the case when the first inner inorganic oxide layer and the second outer oxide layer are formed as the shell, the total thickness of the first and second inorganic oxide layers is preferably in the range of 1 to 50 nm. Especially when a dense shell is desired, the second outer inorganic oxide layer is preferably in the range of 20 to 40 nm.

The pores may contain residual solvent which has been used at the step of preparing the inorganic hollow fine particles, and/or gas penetrating at the step of drying. Further, a precursor substance used for forming pores may remain within the pores within the shell.

The precursor substance is a porous material which is a residue formed by removing a part of the ingredients constituting a nucleus particle surrounded by a shell. The nuclear particle is a porous composite oxide particle composed of different kinds of inorganic oxides. In some cases, the precursor substance remains only a minor amount in a state wherein it sticks to the shell, and in some cases, it remains in a large amount in a state wherein it occupies a predominant part of the micro-pores within the shell.

The porous material formed from the precursor substance may also contain the above-mentioned residual solvent and the above-mentioned gas within the pores of the porous material. In the case when a large proportion of the ingredients constituting the nucleus particle is removed, the volume of pores formed is increased and inorganic hollow fine particles having a low refractive index can be obtained. A low refractive index film made by incorporating the inorganic hollow fine particles has a low refractive index and high antireflection performance.

The average particle diameters of the inorganic hollow fine particles are not particularly limited, but are preferably in the range of 5 to 2,000 nm and more preferably 20 to 100 nm. When the average particle diameter is smaller than 5 nm, the effect of reducing the refractive index due to the hollow shaped particles is minor. In contrast, when the average particle diameter is larger than 2,000 nm, the transparency is drastically lowered with the result that the undesirable diffusion reflection is marked. By the term "average particle diameter" as used herein, we mean a number average particle diameter as measured by observation using a transmitting electron microscope.

Inorganic hollow fine particles can be produced, for example, by a process described in detail in JP-A 2001-233611. The inorganic hollow fine particles used in the present invention can be produced by this process. Commercially available inorganic hollow fine particles can also be used.

The amount of inorganic hollow fine particles is not particularly limited, but it is preferably in the range of 10 to 30% by weight, based on the total weight of the low refractive index layer. When the amount of inorganic hollow fine particles is in this range, an optical multilayer film having good and balanced low refractive index and abrasion resistance can be obtained.

The above-mentioned inorganic hollow fine particles can be used in a liquid dispersion form. The organic solvent used for the preparation of liquid dispersion is not particularly limited, and, as specific examples thereof, there can be mentioned lower aliphatic alcohols such as methanol, ethanol, isopropanol (IPA), n-butanol and isobutanol; ethylene glycol and its derivatives such as ethylene glycol monobutyl ether and ethylene glycol monoethyl ether acetate; diethylene glycol and its derivatives such as diethylene glycol monobutyl ether; diacetone alcohol; aromatic hydrocarbons such as toluene and xylene; aliphatic hydrocarbons such as n-heptane and n-hexane; esters such as ethyl acetate and butyl acetate; and ketones such as acetone, methyl ethyl ketone and methyl isobutyl ketone. These organic solvents may be used either alone or as a combination of at least two thereof.

In the case when the low refractive index layer is a porous body comprising inorganic hollow fine particles dispersed in a matrix, the process for producing the low refractive index layer is not particularly limited, and includes, for example, a process wherein the outer surface of a hard coat layer is coated with a coating liquid comprising a binder resin and inorganic hollow fine particles having void by a conventional coating procedure, and then, if desired, the liquid coating is dried and heat-treated. The optional heat-treatment can be carried out at a temperature usually in the range of 50 to 200° C., preferably 80 to 150° C.

The low refractive index layer used in the present invention preferably has a thickness in the range of 10 to 1,000 nm, preferably 30 to 500 nm. The low refractive index layer is comprised of at least one layer, and it may be comprised of two or more layers.

In the optical multilayer film of the present invention, the refractive index $n_H$ of the hard coat layer and the refractive index $n_L$ of the low refractive index layer must satisfy the following three formulae [1], [2] and [3], $$n_L \leq 1.37 \qquad \text{Formula [1]}$$

$$n_H \geq 1.53 \qquad \text{Formula [2]}$$

$$(n_H)^{1/2} - 0.2 < n_L < (n_H)^{1/2} + 0.2. \qquad \text{Formula [3]}$$

Preferably the refractive index $n_H$ of the hard coat layer and the refractive index $n_L$ of the low refractive index layer satisfy the following three formulae [4], [5] and [6], $$1.25 \leq n_L \leq 1.35 \quad \text{Formula [4]}$$

$$n_H \geq 1.55 \quad \text{Formula [5]}$$

$$(n_H)^{1/2} - 0.15 < n_L < (n_H)^{1/2} + 0.15. \quad \text{Formula [6]}$$

When the above-recited formulae are satisfied, the resulting optical multilayer film having a low reflectivity and thus an optical product having good visibility, good abrasion resistance and high strength can be obtained.

The optical multilayer film of the present invention preferably has a reflectivity of not larger than 0.7% at a wavelength of 550 nm and a reflectivity of not larger than 1.5% at a wavelength in the range of 430 nm to 700 nm. More preferably the optical multilayer film has a reflectivity of not larger than 0.6% at a wavelength of 550 nm and a reflectivity of not larger than 1.4% at a wavelength in the range of 430 nm to 700 nm.

The optical multilayer film of the present invention has a multilayer structure as illustrated, for example, in FIG. 1. The optical multilayer film 50 is comprised of a base film 11, a hard coat layer 21, a low refractive index layer 31 and an anti-staining layer 41, disposed in this order from the bottom.

The optical multilayer film 50 of the present invention can have another intervening layer between the base film 11 and the hard coat layer 21. The optional intervening layer can be a primer layer (not shown).

The primer layer has a function of imparting adhesion to or enhancing adhesion between the base film and the hard coat layer. The primer layer is made of materials such as a polyester-urethane resin, a polyether-urethane resin, a polyisocyanate resin, a polyolefin resin, a resin having a hydrocarbon backbone and/or polybutadiene backbone, a polyamide resin, an acylic resin, a polyester resin, a vinyl chloride-vinyl acetate copolymer, chlorinated rubber, cyclized rubber, and modified rubbers prepared by introducing a polar group in the above-recited rubbers. Of these, the modified resin prepared from a resin having a hydrocarbon backbone and/or polybutadiene backbone, and the modified resin prepared from cyclized rubber are preferable.

The resin having a hydrocarbon backbone and/or polybutadiene backbone includes a resin having a polybutadiene backbone or a backbone composed of at least partially hydrogenated polybutadiene. As specific examples of the resin, there can be mentioned a polybutadiene resin, a hydrogenated polybutadiene resin, and a styrene-butadiene-styrene block copolymer (SBS copolymer) and a hydrogenation product of the block copolymer (i.e., SEBS copolymer). An especially preferable resin is a modified resin of the hydrogenation product of styrene-butadiene-styrene block copolymer.

The polar group to be introduced into the resin for modification is preferably derived from a carboxylic acid or its derivatives. The specific examples of the carboxylic acid or its derivatives, there can be mentioned unsaturated carboxylic acids such as acrylic acid, methacrylic acid, maleic acid and fumaric acid; and halides, amides, imides, anhydrides and esters of unsaturated carboxylic acids such as maleyl chloride, maleimide, maleic anhydride and citraconic anhydride. A resin modified with an unsaturated carboxylic acid or an hydride thereof is preferable because of good adhesion. Acrylic acid, methacrylic acid, maleic acid and maleic anhydride are more preferable. Maleic acid and maleic anhydride are especially preferable. These unsaturated carboxylic acids and derivatives thereof may be used as a combination of at least two thereof.

The procedure for forming the primer layer is not particularly limited, and includes, for example, a conventional procedure of coating the surface of a base film with a primer-forming coating liquid to form a coating on the base film.

The thickness of primer layer is not particularly limited and is usually in the range of 0.3 to 5 μm and preferably 0.5 to 2 μm.

The optical multilayer film of the present invention can have, if desired, an anti-staining layer (shown as numeral 41 in FIG. 1) on the low refractive index layer to protect the low refractive index layer and imparts an anti-staining performance to the optical multilayer film.

The material for use in the anti-staining layer is not particularly limited, provided that it does not exert a baneful influence on the refractive index layer and has an anti-staining function. The anti-staining layer-forming material preferably includes compounds having a hydrophobic group, and, as specific examples thereof, there can be mentioned a perfluoroalkylsilane compound, a perfluropolyethersilane compound and a fluorine-containing silicone compound.

The method for forming the anti-staining layer can be appropriately chosen depending upon the particular material used, and it includes, for example, physical vapor-phase growth methods such as vapor deposition method and sputtering method, chemical vapor growth methods such as CVD, and wet-coating methods. The thickness of the anti-staining layer is not particularly limited, but is preferably not larger than 20 nm and more preferably in the range of 1 to 10 nm.

The optical multilayer film of the present invention has good optical properties and low reflectivity, and therefore, it is suitable for an anti-reflective protection film of optical goods.

An anti-reflective protective film is usually provided in an optical apparatus for preventing or minimizing the reduction of contrast and glare and mirroring due to reflection of light. Such apparatus includes, for example, image display apparatuses such as a liquid crystal display apparatus, a plasma display panel, an EL element and a cathode-ray tube display apparatus; and a touch sensitive panel or screen. The antireflective protective film is usually provided as the upper-most layer disposed on the viewing side of an optical element.

The optical multilayer film of the present invention is used as an optical element, especially preferably as a protective film for a polarizer in a liquid crystal display apparatus.

The polarizing plate having an antireflection function of the present invention is characterized as comprising the optical multilayer film of the present invention, and a polarizing film laminated on the surface of a bass film of the optical multilayer film, which surface is opposite to the surface on which the low refractive index layer is formed.

The polarizing film which can be used in the present invention is not particularly limited provided that it has a polarizing function. As specific examples of the polarizing film, there can be mentioned those which are made of polyvinyl alcohol (PVA) and a polyene.

The polarizing film used in the present invention preferably has a polarization percentage of at least 99.9%, more preferably at least 99.95%. The polarization percentage is determined as follows. Two polarizing films are superposed in a manner such that the polarizing axes are in parallel and a light transmittance ($H_0$) of the superposed films is measured. Two polarizing films are superposed in a manner such that the polarizing axes are perpendicular to each other and a light transmittance ($H_{90}$) of the superposed films is measured. The measurement of light transmittance is carried out according to JIS Z8701 using a C light source at a visual field of 2 degrees by using a spectrophotometer. The polarization percentage is calculated from the following equation. The $H_{90}$ and $H_{90}$ are values as corrected depending upon the visual sensitivity.

Polarization percentage (%)= $[(H_0-H_{90})/(H_0+H_{90})]^{1/2} \times 100$

The process for producing the polarizing film is not particularly limited, and the polarizing film can be produced by a conventional process. For example, the process for producing a polyvinyl alcohol (PVA) polarizing film includes a process wherein a PVA film is allowed to adsorb an iodine ion, and then uniaxially stretched; a process wherein a PVA film is uniaxially stretched and then allowed to adsorb an iodine ion; a PVA film is allowed to absorb an iodine ion and simultaneously niaxially stretched; a process wherein a PVA film is dyed with a dichroic dye and then uniaxially stretched; a process wherein a PVA film is uniaxially stretched and then dyed with a dichroic dye; and a process wherein a PVA film is dyed with a dichroic dye and simultaneously uniaxially stretched. The process for producing a polyene polarizaing film includes a process wherein a PVA film is uniaxially stretched and then heated in the presence of a dehydrating catalyst to be thereby dehydrated; and a process wherein a polyvinyl chloride film is uniaxially stretched and then heated in the presence of a dehydrochlorination catalyst to be thereby dehydrated.

The polarizing plate having an antireflection function of the present invention can be produced by laminating the polarizing film on the surface of a base film in the optical multilayer film of the present invention, which surface is opposite to the surface on which the low refractive index layer is formed.

The lamination of the polarizing film with the base film can be carried out by adhering together by an appropriate means using an adhesive or a self-adhesive. The adhesive or self-adhesive includes, for example, an acrylic adhesive, a silicone adhesive, a polyester adhesive, a polyurethane adhesive, a polyether adhesive and a rubber adhesive. Of these, an acrylic adhesive is preferable because of high heat resistance and good transparency.

Figure 2:
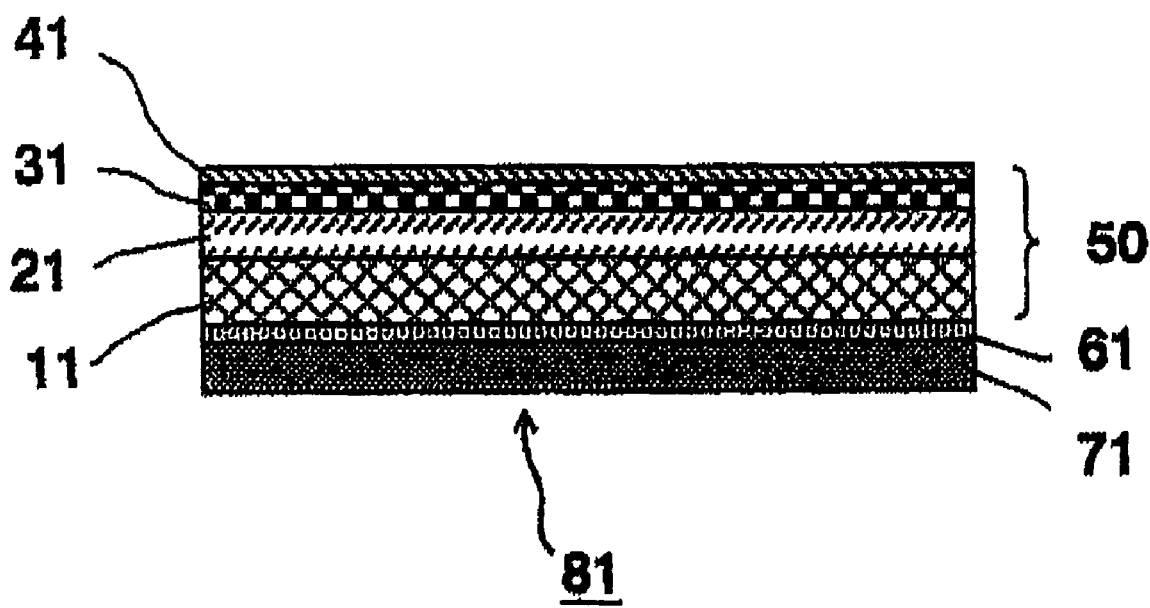
FIG. 2 is a cross-sectional view illustrating the multilayer structure of an optical multilayer film having an antireflection performance according to the present invention.

The polarizing plate having an antireflection function of the present invention has a multilayer structure as illustrated, for example, in FIG. 2. The polarizing plate 81 illustrated in FIG. 2 is comprised of the optical multilayer film of the present invention 50, and a polarizing film 71. The polarizing film 71 is laminated through an adhesive or self-adhesive layer 61 on the surface of a base film 11 of the optical multilayer film 50, which surface is opposite to the surface on which the low refractive index layer 31 is formed.

The polarizing plate having an antireflection function of the present invention may have another protective film (not shown in FIG. 2) which is laminated on the surface of the polarizing film 71, which surface is opposite to the surface on which the base film 11 is adhered through an adhesive or self-adhesive layer 61. The protective layer preferably made of a material having a low anisotropy. The material having a low anisotropy is not particularly limited, and includes, for example, cellulose esters such as triacetyl cellulose and a polymer resin having an alicyclic structure. A polymer resin having an alicyclic structure is especially preferable because of good transparency, low birefringence and good dimensional stability. As examples of the polymer resin having an alicyclic structure, there can be mentioned those which are recited above with respect to the base film of the optical multilayer film. As examples of the adhesive or self-adhesive, there can be mentioned those which are recited above with respect to the adhesion between the protective film for the polarizing plate, and the base film. The thickness of the polarizing plate having an antireflection function of the present invention is not particularly limited, but is usually in the range of 60 μm to 2 mm.

The optical product of the present invention is characterized as being provided with the polarizing plate having an antireflection function of the present invention. The optical product provided with the polarizing plate having an antireflection function includes, for example, a liquid crystal display apparatus and a touch sensitive panel or screen.

Figure 3:
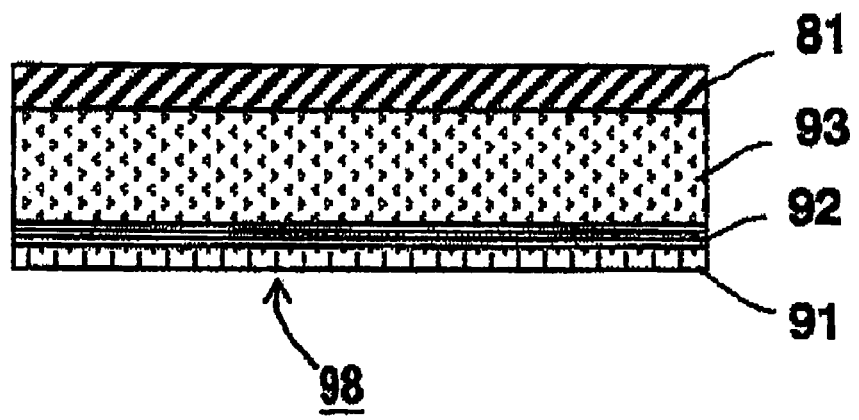
FIG. 3 is a cross-sectional view illustrating the multilayer structure of an optical multilayer film of the present invention adhered on a liquid crystal display cell.
Figure 4:
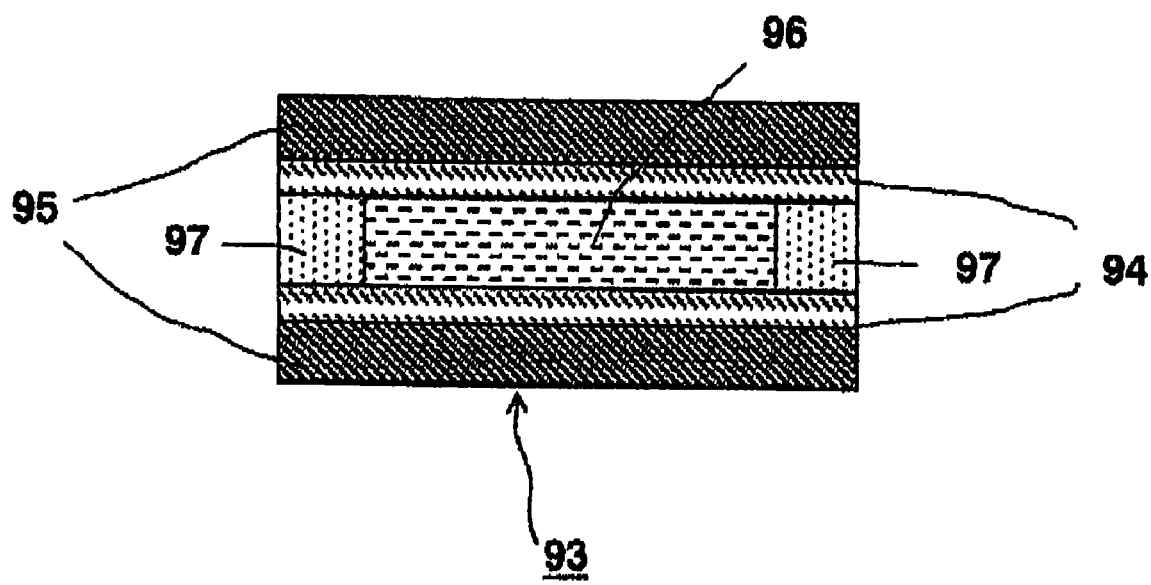
FIG. 4 is a cross-sectional view illustrating the layer structure of the liquid crystal display cell shown in FIG. 3.

The liquid crystal display element provided with the polarizing plate having an antireflection function of the present invention, as one example of the optical product provided with the polarizing plate having an antireflection function of the present invention, has a multilayer structure as illustrated in FIG. 3. The liquid crystal display element 98 illustrated in FIG. 3 is comprised of a polarizing plate 91, a phase plate 92, a liquid crystal cell 93 and the polarizing plate 81 having an antireflection function of the present invention, disposed in this order from the bottom. The polarizing plate 81 having an antireflection function is laminated on the liquid cell 93 through an adhesive or self-adhesive (not shown) so that the polarizing plane confronts to the liquid crystal cell. The liquid crystal cell 93 has, for example, a structure as illustrated in FIG. 4, wherein two electrode base plates 95 each having provided with a transparent electrode 94 are disposed at a predetermined space in a fashion such that the two transparent electrodes 94 confront each other, and a liquid crystal 96 is inserted in the space between the transparent electrodes 94. Both end portions of the liquid crystal 96 are sealed with seals 97.

For the formation of the liquid crystal display apparatus, one additional layer or two or more additional layers may be disposed in addition to the above-mentioned layers. Such additional layers include, for example, a luminance-enhancing film, a prism array sheet, a lens array sheet, a light guide plate, a light diffusion plate and a subsurface illuminator.

The mode of the liquid crystal 96 is not particularly limited, and, as specific examples of the liquid crystal mode, there can be mentioned TN (Twisted Nematic) type mode, an STN (Super Twisted Nematic) type mode, an HAN (Hybrid Alignment Nematic) type mode, an MVA (Multiple Vertical Alignment) type mode, an IPS (In Plane Switching) type mode and an OCB (Optical Compensated Bend) type mode.

The liquid crystal display apparatus 98 illustrated in FIG. 3 can be used as normally white mode giving bright indication and dark indication at a low voltage and a high voltage, respectively, and as normally black mode giving dark indication and bright indication at a low voltage and a high voltage, respectively.

The optical product of the present invention is provided with a polarizing plate having an antireflection function, which is characterized in that a low light reflection can be attained over a wide band width. Therefore, the liquid crystal display exhibits good visibility (i.e., glare and mirroring are minimized) and high contrast between darkness and brightness indications.

EXAMPLES

The invention will now be described by the following examples that by no means limit the scope of the present invention. In the examples, parts are by weight unless otherwise specified.

The physical properties were evaluated by the following methods in the examples.

(1) Thickness (Datum Thickness, Thickness Fluctuation) in Base Film

A film was cut at a width of 100 mm in the lengthwise direction. Thickness was measured on the cut film using a contact type web thickness measurement apparatus ("RC-101" available from Maysun Corporation). The measurement was conducted on measurement points at intervals of 0.48 mm along a line extending in the transverse direction of the out film. The arithmetic mean value of thickness data is datum film thickness T (μm). The fluctuation of film thickness is calculated from the following equation.

Film thickness fluctuation (%)=$(T_{max}-T_{min})/T \times 100$ where $T_{max}$ is the maximum value (μm) of thickness and the $T_{min}$ is the minimum value (μm) of thickness.

(2) Volatile Content (% by weight) in Base Film

Water and organic matter, adsorbed on a glass tube having an inner diameter of 4 mm, were completely removed from the glass tube. 200 mg of a base film was placed in the glass tube. Then the glass tube was heated to 100° C. and maintained at that temperature for 60 minutes during which generated gas was continuously collected. The collected gas was analyzed by a thermal desorption gas chromatography mass spectrometric analyzer (TDS-GC-MS). Among the collected gas, the total amount of ingredients having a molecular weight of not larger than 200 was measured as the residual volatile ingredients.

(3) Saturated Water Absorption (% by weight) of Base Film

A base film was immersed in water at 23° C. for one week according to ASTM D530, and the weight increase of film was measured.

(4) Depth or Height (μm) of Die Line on Base Film

Using a non-contact three dimensional surface configuration and roughness tester (available from Zygo Corporation), die lines on a base film were observed at a visual field of 5.6 mm (transverse direction)×4.4 mm (longitudinal direction). The visual field was divided into 640 (transverse direction)×480 (longitudinal direction) squares, and the depth or height of die lines was observed on these squares.

(5) Refractive Index of Hard Coat Layer and Low Refractive Index Layer

Using high speed spectral elipsometric meter ("M-2000U" available from J.A. Woollam Co.), the measurement was conducted at a wavelength of 245–1000 nm, and incident angles of 55°, 60° and 65°. The refractive index was calculated from the data obtained by measurement.

(6) Degree of Polarization of Polarizing Film

Two polarizing films were superposed in a manner such that the polarizing axes were in parallel, and a light transmittance ($H_0$) of the superposed films was measured. Two polarizing films were superposed in a manner such that the polarizing axes were perpendicular to each other, and a light transmittance ($H_{90}$) of the superposed films was measured. The measurement was carried out according to JIS Z8701 using C light source at a visual field of 2 degrees by using a spectrophotometer. The polarization percentage was calculated from the following equation. The $H_{90}$ and $H_{90}$ were values as corrected depending upon the visual sensitivity.

Polarization percentage (%)= $[(H_0-H_{90})/(H_0+H_{90})]^{1/2} \times 100$ (7) Light Reflectivity (%)

Reflected ray spectrum was measured on voluntarily chosen three measurement points on an optical multilayer film using a spectrophotometer ("Ultraviolet Visible Near-Infrared Spectrophotometer V-570" available from JASCO Corporation) at an incident angle of 5° and at a wavelength in the range of 430 to 700 nm. The light reflectivity was expressed by the reflectivity as measured at a wavelength of 550 nm and the maximum reflectivity as measured in the wavelength range of 430 to 700 nm.

(8) Visibility

A polarizing plate was out into a square having a size of about 10 cm×about 10 cm. Using the square polarizing plate, a liquid crystal display element having a layer structure as illustrated in FIG. 3 was made in a fashion that the low refractive index layer of the polarizing plate 81 was located as the uppermost layer. The thus-made liquid crystal display element 98 was placed on a commercially available light box ("Light-Viewer 7000PRO" available from HAKUBA Photo Industry Co.) to manufacture a simplified liquid crystal panel. The panel was viewed from the front with a liquid crystal display element indication of black. The visibility was evaluated according to the following three ratings.

A: Glare and mirroring were not observed at all. By the term "glare" as used herein, we mean that unpleasant feeling or indistinctness due to the fact that too bright spots or plane are found in the visual field. That is, dazzling brightness is directly or indirectly felt from a light source.

B: Glare and mirroring were observed to a slight extent.

C: Glare and mirroring were observed on the entire visual field.

The liquid crystal display element 98 is made by laminating a polarizing plate 81 having an antireflection function on one surface of a liquid crystal cell 93, and laminating a lower side polarizing plate 91 on the other surface of the liquid crystal cell 93 with an intervening phase plate 92.

The liquid crystal cell 93 is made, as illustrated in FIG. 4, by disposing two electrode base plates 95, each being provided with a transparent electrode 94 on one surface thereof, in a manner such that the transparent electrodes 94 confront each other with a predetermined space between the two transparent electrodes 94, and then, introducing a liquid crystal 96 within the space. Both end portions of the liquid crystal 96 are sealed with a seal 97. The liquid crystal display element 98 is fixed to a plastic frame to give shape retention to the liquid crystal display element 98.

The polarizing plate 81 having an antireflection function is made, as illustrated in FIG. 2, by laminating an optical multilayer film 50 of the present invention onto the upper surface of a polarizing film 71 with an intervening adhesive or self-adhesive layer 61 between the polarizing film 71 and the optical multilayer film 50.

(9) Contrast

The liquid crystal display panel made in the above (8) was placed in a dark room, and luminance was measured at an angle of 5° from the normal by using a color luminance tester "BM-7" available from Topcon Co. The measurement was conducted at a black state and a white state, and the contrast was expressed in terms of a ratio of the luminance as measured at a brightness indication to the luminance as measured at a darkness indication. The larger the luminance ratio, the better the visibility.

Production Example 1

Preparation of Base Film 1A

Pellets of a norbornene polymer (trade name "ZEONOR 1420R" available from Zeon Corporation, glass transition temperature: 136° C., saturation water absorption: below 0.01% by weight) were dried in a hot air oven at 110° C. for 4 hours. The pellets were melt-extruded at 260° C. through a single screw extruder equipped with a coathanger T-die with a lip width of 650 mm and having a die lip provided with a leaf disc-shaped polymer filter (filtration precision: 30 μm). The inner surface of the die lip used was chromium-plated and had a surface roughness Ra of 0.05 μm. Thus, a base film 1A having a width of 600 mm was obtained. The base film 1A had a volatile content of not larger than 0.01% by weight and a saturated water content of not larger than 0.01% by weight. The base film 1A had a datum thickness of 40 μm, a thickness fluctuation of 2.3% and a die line depth of 0.01 μm.

Production Example 2

Preparation of Hard Coat Layer-Forming Composition 1

To 100 parts by weight of a modified alcohol sol of antimony pentaoxide (solid content: 30%, supplied by Catalysts and Chemicals Ind. Co., Ltd.), 10 parts by weight of ultraviolet-curable urethane acrylate (tradename "Shikou UV 7000B" available from The Nippon Synthetic Chem. Ind. Co., Ltd.) and 0.4 part by weight of a photopolymerization initiator (tradename "Irgacure 184" available from Ciba-Geigy) were added and mixed together to prepare an ultraviolet-curable, hard coat layer-forming composition 1.

Production Example 3

Preparation of Silicon Alkoxide Solution 1

An oligomer of tetramethoxysilane ("Methyl silicate 51" available from Colcote Co.) was mixed with methanol at a ratio of 47:75 by mass to prepare liquid A. Water, aqueous ammonia (ammonia content: 28% by weight) and methanol were mixed together at a ratio of 60:1.2:97.2 by weight to prepare liquid B. Liquid A and Liquid B were mixed together at a ratio of 16:17 by weight to prepare a silicon alkoxide solution 1.

Production Example 4

Preparation of Silicon Alkoxide Solution 2

A silicon alkoxide solution 2 was prepared by the same procedure as described in Production Example 3 except that liquid A was prepared by mixing an oligomer of tetramethoxysilane with methanol at a ratio of 47:78 by mass with all other conditions remaining the same.

Production Example 5

Preparation of Silicon Alkoxide Solution 3

A silicon alkoxide solution 2 was prepared by the same procedure as described in Production Example 3 except that liquid A was prepared by mixing an oligomer of tetramethoxysilane ("Methyl silicate 51" available from Colcote Co.) with methanol at a ratio of 47:79 by mass with all other conditions remaining the same.

Production Example 6

Preparation of Low Refractive Index Layer-Forming Composition 300 g of tetraethoxysilane was mixed with 455 g of ethanol. To the thus-obtained mixture, 295 g of an aqueous citric acid solution having a concentration of 1.0% by mass was added, and the mixture was stirred at room temperature for 1 hour to give a hydrolysis product A of tetraethoxysilane.

1,020 parts of the hydrolysis product A of tetraethoxysilane, 0.42 part of a terminal-reactive dimethyl silicone oil (L-9000 supplied by Nippon Unicar Co., Ltd.), 2,700 parts of propylene glycol monomethyl ether and 6,300 parts of isopropyl alcohol were mixed together to give a low refractive index layer-forming composition.

Production Example 7

Preparation of Polarizing Film

A PVA film (degree of polymerization: 2,400, degree of saponification: 99.9%) with a thickness of 45 μm was swollen with pure water. The swollen PVA film was immersed in an aqueous solution containing 1% by weight of iodine and 3% by weight of potassium iodide, whereby the PVA film was dyed. Then the PVA film was dipped in an aqueous boric acid solution with a 4.5% by weight concentration, and then stretched at a draw ratio of 5.3 in the longitudinal direction. Subsequently the PVA film was dipped in an aqueous borax solution with a 5% by weight concentration and stretched at a total draw ratio of 5.5. Water was removed from the stretched film, and the film was dried at 50° C. to prepare a polarizing film. The polarizing film had a thickness of 18 μm and a polarization degree of 99.95%.

Example 1

Both surfaces of the base film 1A produced in Production Example 1 were subjected to a corona discharge treatment to give a base film 1B having a modified surface exhibiting a surface tension of 0.072 N/m. The corona discharge treatment was conducted for 3 seconds by using a high frequency oscillator ("Corona-Generator HV05–2" available from Tamtec Co.) at an output voltage of 100% and an output power of 250 W, using a wire electrode having a diameter of 1.2 mm and an electrode length of 240 mm at a work electrode distance of 1.5 mm.

One surface of the base film 1B was coated with a hard coat layer-forming composition 1 prepared in Production Example 2, so that a hard coat layer having a thickness of 5 μm was formed. The coating was continuously carried out using a die coater. The coating was dried at 80° C. for 5 minutes, and then irradiated with ultraviolet rays at an integrated light quantity of 300 mJ/cm² whereby the hard coat layer-forming composition was cured to form a hard coat layer-laminated film 1C. The cured hard coat layer had a thickness of 5 μm, a surface roughness of 0.2 μm and a refractive index of 1.62.

The silicon alkoxide solution 1 prepared in Production Example 3 was stirred and, when one minute elapsed from the start of mixing, the solution 1 was dropped onto the above-mentioned hard coat layer-laminated film 1C (having a size of 15 cm×15 cm). Then the laminated film 1C was placed in a revolution room of a spin coater, and spin coating was carried out whereby the surfaces of the laminated film were coated with the silicon alkoxide solution. An alcohol was previously placed in the revolution room of the spin coater so that the spin coating was conducted in an alcohol atmosphere. The rotation of glass plate was conducted at a revolution of 700 rpm for 10 seconds. The coating of the silicon alkoxide solution 1 was allowed to leave for 1 minute and 15 seconds to form a film composed of a gel-like silicon alkoxide.

The gel-like film was dipped in an aging mixed solution for 5 minutes which comprised water, aqueous 28% ammonia and methanol at a mixing ratio of 162:4:40 by mass. The gel-like film was aged for 24 hours. Further, the aged film was dipped in a 10% hexamethyldisilazane solution in isopropanol to be thereby dehydrated.

The dehydrated film was dipped in isopropanol to be thereby washed. The washed film was placed in a high pressure vessel, and the vessel was filled with liquid carbon dioxide, and then supercritical drying was conducted at a temperature of 80° C. and a pressure of 16 MPa for 2 hours. Thus, a laminated film 1D was obtained which had a silica aero-gel film (hereinafter referred to as "low refractive index layer" when appropriate) having a thickness of 100 nm, laminated on the laminated film 1C. The low refractive index layer had a refractive index of 1.33.

The exposed surface of the low refractive index layer of the laminated film 1D was coated with an anti-staining coating liquid by a dip coating method. The anti-staining coating liquid was a 0.1% by weight diluted solution of a fluorine-containing surface-anti-staining coating agent ("Optool DSX" available from Daikin Industries, Ltd.) in perfluorohexane. The coating was dried by heating at 60° C. for 1 minute to form an anti-staining layer having a thickness of 5 nm. Thus an optical multilayer film 1E (polarizing plate-protecting film) was obtained.

The polarizing film produced in Product Example 7 was adhered on the surface of the optical multilayer film 1E, which surface is opposite to the side of low refractive index layer, through an acrylic adhesive ("DP-8005 Clear" available from Sumitomo 3M Co.). Thus a polarizing plate having an antireflection function 1F was obtained. Optical characteristics of the polarizing plate 1F were evaluated. The results are shown in Table 1.

Example 2

The procedures described in Example 1 were repeated wherein, instead of the base film 1A, a triacetyl cellulose (TAC) film having a thickness of 40 μm ("KC4UX2M" available from Konica-Minolta Co.; Tg: 120° C., saturated water absorption: 4.5% by weight, volatile content: 6.0% by weight; hereinafter referred to as "base film 2A") was used with all other conditions remaining the same. Thus, an optical multilayer film 2E (polarizing plate-protecting film) and a polarizing plate 2F having an anti-reflection function were obtained. The hard coat layer formed had a refractive index of 1.62 and the low refractive index layer formed had a refractive index of 1.33. The optical characteristics of the polarizing plate were evaluated. The results are shown in Table 1.

Example 3

The procedures described in Example 1 were repeated wherein, instead of the base film 1A, a polyethylene terephthalate film having a thickness of 50 μm ("Cosmo-shine A4300" available from TOYOBO Ltd.; hereinafter referred to as "base film 3A") was used with all other conditions remaining the same. Thus, an optical multilayer film 3E (polarizing plate-protecting film) and a polarizing plate 3F having an anti-reflection function were obtained. The hard coat layer formed had a refractive index of 1.62 and the low refractive index layer formed had a refractive index of 1.33. The optical characteristics of the polarizing plate were evaluated. The results are shown in Table 1.

Example 4

The procedures described in Example 1 were repeated wherein, instead of the base film 1A, a polarizing plate made from a triacetyl cellulose film ("Super High Contrast Polarizing Plate SKN-18243T" available from Polatechno Co.; polarization percentage: 99.993%) was used with all other conditions remaining the same. Thus, a hard coat layer and a low refractive index layer were formed to obtain an optical multilayer film 4E. The optical multilayer film had a polarizing film laminated thereon, and therefore, the optical multilayer film 4E was evaluated as a polarizing plate having an anti-reflection function for its optical characteristics. The results are shown in Table 1.

Comparative Example 1

The procedures described in Example 1 were repeated wherein a low refractive index layer was formed using a silicon alkoxide solution 2 produced in Production Example 4 instead of the silicon alkoxide solution 1 with all other conditions remaining the same. Thus, an optical multilayer film 5E (polarizing plate-protecting film) and a polarizing plate 5F having an anti-reflection function were obtained. The hard coat layer formed had a refractive index of 1.62 and the low refractive index layer formed had a refractive index of 1.39. The optical characteristics of the polarizing plate were evaluated. The results are shown in Table 1.

Comparative Example 2

The procedures described in Example 1 were repeated wherein a low refractive index layer was formed using a silicon alkoxide solution 3 produced in Production Example 5 instead of the silicon alkoxide solution 1 with all other conditions remaining the same. Thus, an optical multilayer film 6E (polarizing plate-protecting film) and a polarizing plate 6F having an anti-reflection function were obtained. The hard coat layer formed had a refractive index of 1.62 and the low refractive index layer formed had a refractive index of 1.40. The optical characteristics of the polarizing plate were evaluated. The results are shown in Table 1.

Comparative Example 3

The procedures described in Example 1 were repeated wherein a hard coat layer was formed using a hard coat layer-forming composition 2 (ultraviolet-curable type high refractive index material; "Dai-cure Clear SD-715" available from Dai-nippon Ink and Chemical Ind.), and a low refractive index layer was formed form using the low refractive index layer-forming composition produced in Production Example 6 with all other conditions remaining the same. Thus, an optical multilayer film 7E and a polarizing plate 7F having an anti-reflection function were obtained. The hard coat layer formed had a refractive index of 1.52 and the low refractive index layer formed had a refractive index of 1.45. The optical characteristics of the polarizing plate were evaluated. The results are shown in Table 1.

TABLE 1

|  | Ex. 1 | Ex. 2 | Ex. 3 | Ex. 4 | Comp. Ex. 1 | Comp. EX. 2 | Comp. Ex. 3 |
|---|---|---|---|---|---|---|---|
| Base film | 1A | 2A | 3A | 4A | 1A | 1A | 1A |
| Depth or height of die line (μm) | 0.01 | <0.01 | <0.01 | <0.01 | 0.01 | 0.01 | 0.01 |
| Optical multilayer film | 1E | 2E | 3E | 4E | 5E | 6E | 7E |
| Hard coat layer-forming composition | 1 | 1 | 1 | 1 | 1 | 1 | 2 |
| Refractive index of hard coat layer [–] | 1.62 | 1.62 | 1.62 | 1.62 | 1.62 | 1.62 | 1.52 |
| Refractive index of low refractive index layer [–] | 1.33 | 1.33 | 1.33 | 1.33 | 1.39 | 1.40 | 1.45 |
| Light reflectivity (%) at 550 nm | 0.54 | 0.55 | 0.56 | 0.55 | 1.35 | 1.52 | 2.6 |
| Light reflectivity (%) at 430–700 nm | 1.1 | 1.4 | 1.3 | 1.4 | 2.0 | 2.2 | 3.2 |
| Visibility | A | A | A | A | C | C | C |
| Contrast | 200 | 280 | 280 | 300 | 150 | 100 | 70 |

As seen from Table 1, the optical multilayer film of the present invention (described in Examples 1 to 3), which comprises a hard coat layer and a low refractive index layer comprising aerogel, which layers are laminated, in this order, on one surface of a base film comprising a transparent resin, wherein the refractive index $n_H$ of the hard coat layer and the refractive index $n_L$ of the low refractive index layer satisfy the following three formulae [1], [2] and [3], $$n_L \leq 1.37 \quad \text{Formula [1]}$$

$$n_H \geq 1.53 \quad \text{Formula [2]}$$

$$(n_H)^{1/2} - 0.2 < n_L < (n_H)^{1/2} + 0.2, \quad \text{Formula [3]}$$

has a small reflectivity at a wavelength of 550 nm and a small reflectivity at a wavelength of 430 to 700 nm, and exhibits good visibility and high contrast between darkness and brightness indications.

In contrast, the optical multilayer film not satisfying the above-formulae [1], [2] and [3] has a large reflectivity at a wavelength of 550 nm and a large reflectivity at a wavelength of 430 to 700 nm, and exhibits poor visibility and low contrast between darkness and brightness indications.

INDUSTRIAL APPLICABILITY

The optical multilayer film of the present invention has good optical properties and low reflectivity, and therefore, it is suitable for an anti-reflective protection film of optical goods.

A polarizing plate having an anti-reflection function, which is provided with the optical multilayer film, exhibits a reduced reflectivity over a wide region, and is suitable for optical goods such as a liquid crystal display apparatus, a touch sensitive panel or screen, and an electroluminescence display apparatus. The optical goods provided with the optical multilayer film of the invention exhibits a low exhibit a low reflectivity and reduced glare and mirroring, and good visibility. Especially the liquid crystal display further exhibits a high contrast between darkness and brightness indications.

The invention claimed is:

1. An optical multilayer film comprising a hard coat layer and a low refractive index layer comprising a transparent porous body having bubbles dispersed in a matrix composed of a hydrolyzable organic silicon compound or a hydrolyzed product thereof, wherein the hard coat layer and the low refractive index layer are laminated, in this order, directly or with another intervening layer on one surface of a base film comprising a transparent resin, wherein the refractive index $n_H$ of the hard coat layer and the refractive index $n_L$ of the low refractive index layer satisfy the following three formulae [1],[2] and [3], $$1.25 \leq n_L \leq 1.37 \quad \text{Formula [1]}$$

$$n_H \geq 1.53 \quad \text{Formula [2]}$$

$$(n_H)^{1/2} - 0.2 < n_L < (n_H)^{1/2} + 0.2 \quad \text{Formula [3]}.$$

2. The optical multilayer film according to claim 1, wherein the refractive index $n_H$ of the hard coat layer and the refractive index $n_L$ of the low refractive index layer satisfy the following three formulae [4], [5] and [6], $$1.25 \leq n_L \leq 1.35 \quad \text{Formula [4]}$$

$$n_H \geq 1.55 \quad \text{Formula [5]}$$

$$(n_H)^{1/2} - 0.15 < n_L < (n_H)^{1/2} + 0.15 \quad \text{Formula [6]}.$$

3. The optical multilayer film according to claim 1, which has a reflectivity of not larger than 0.7% at a wavelength of 550 nm and a reflectivity of not larger than 1.5% at a wavelength in the range of 430 nm to 700 nm.

4. The optical multilayer film according to claim 1, wherein the base film has a die line with a depth or height of not larger than 0.1 μm.

5. The optical multilayer film according to claim 1, wherein the transparent resin is selected from the group consisting of a polymer resin having an alicyclic structure, a cellulose resin and a polyester resin.

6. The optical multilayer film according to claim 1, wherein the transparent resin is a polymer resin having an alicyclic structure.

7. The optical multilayer film according to claim 1, which is an antireflection protective film provided in an optical member.

8. The optical multilayer film according to claim 7, which is a polarizing plate-protecting film.

9. A polarizing plate having an antireflection function comprising the polarizing plate-protecting film as claimed in claim 8, which further has a polarizing film laminated on the surface of the polarizing plate-protecting film, opposite to the surface on which the low refractive index layer is formed.

10. An optical product provided with the polarizing plate having an antireflection function as claimed in claim 9.

* * * * *